United States Patent Office 3,306,073
Patented Feb. 28, 1967

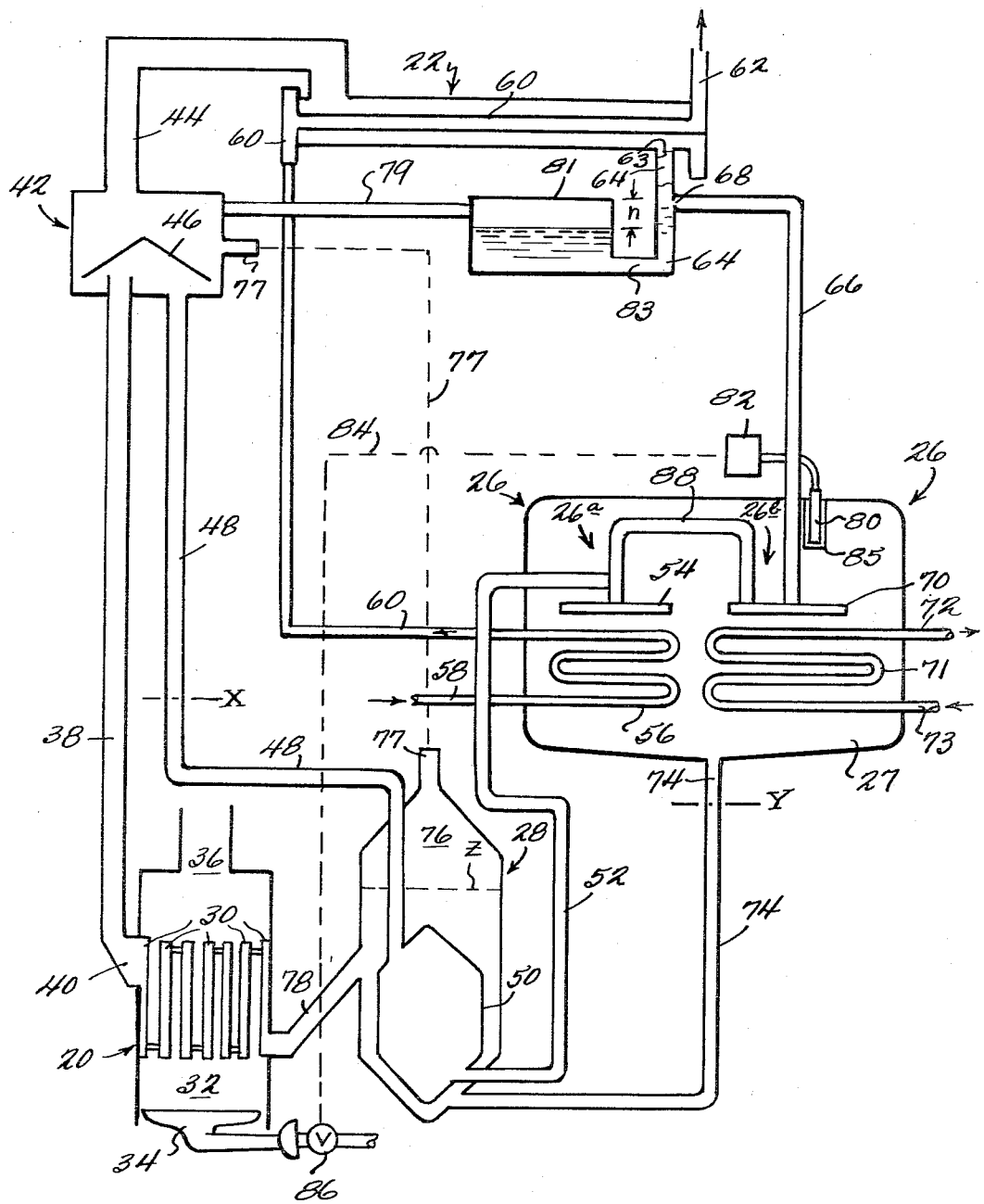

3,306,073
SHORT CYCLE PREVENTION IN REFRIGERATION SYSTEM
William E. Stephan, Evansville, Ind., assignor to Arkla Industries Inc., Evansville, Ind., a corporation of Delaware
Filed Nov. 26, 1965, Ser. No. 509,990
4 Claims. (Cl. 62—476)

This invention relates to absorption refrigeration systems which include a generator, a condenser and an evaporator, and in particular it relates to the control of the evaporator during start-up of the system.

The present invention is particularly adapted for use in systems of the two-pressure type disclosed in the patent to Thomas et al. 2,282,503 and Anderson 3,177,930. The refrigeration systems disclosed in these patents operate in a partial vacuum having a high pressure side including a generator and condenser, and a low pressure side including an evaporator and an absorber. In the illustrative embodiments described in said patents, water is the refrigerant, and the absorbent is a saline solution, such as a water solution of a salt, for example, lithium chloride, lithium bromide, or the like. The refrigerant and absorbent are introduced into the system as a water solution of a salt, as referred to, and the absorbent occurs in the system as a dilute or concentrated water solution of the salt.

As is known, this type of refrigeration system, usually referred to as a two-pressure refrigeration system, absorbs heat by the evaporation of the water refrigerant in the evaporator, after which the water vapor is absorbed by the concentrated saline solution in the absorber. The resulting dilute water solution then passes to a generator where heat is added to volatilize some of the water, the solution being continually returned to the absorber. Heat is removed from the water vapor in the condenser after which the liquid water passes again to the evaporator.

During start-up of any kind of absorption refrigeration system the evaporator pressure generally drops rapidly and momentarily below the usual operating pressure and is accompanied by a drop in temperature. This drop in operating pressure and temperature is due to a drop in the pressure in the absorber. As soon as absorbent weak in refrigerant reaches the absorber, the partial pressure of refrigerant in the absorber is as low as it is ever going to be, and vapor rushes from the evaporator to get into the absorber. This produces the just-mentioned rapid drop in the evaporator pressure and temperature. The drop in evaporator temperature may be a disadvantage when it is of sufficient magnitude to activate the low temperature cut-out device which is often employed to shut down the system in response to a predetermined low evaporator temperature. As is known, cut-out devices are conventionally employed for the purpose of preventing freezing of the water in the evaporator. When the evaporator temperature rises sufficiently, operation will be resumed but may be interrupted by the same occurrence. Under some conditions the system might continue this short-cycling operation indefinitely.

It is the broad object of the present invention to provide for slowing down the start-up temperature drop in the evaporator of an absorbent type refrigeration system by introducing absorbent liquid into the evaporator at start-up so that the evaporator temperature drops gradually as the absorbent flows out of the evaporator and is replaced by refrigerant.

It is a more specific object of the present invention to avoid short-cycling upon start-up of an absorption refrigeration system by preventing a large temperature drop in the evaporator during start-up. By maintaining the evaporator temperature above any predetermined cut-out temperature start-up the system will not be shut down by the above-described tendency.

It is a still more specific object of the present invention to maintain the temperature in the evaporator during start-up by feeding absorption solution from a part of the refrigeration system, such as the absorber, to the evaporator for a short period of time after start-up. The low pressure in the evaporator causes the mixture therein to boil, but the higher boiling point of the solution relative to the refrigerant liquid prevents a large drop in the temperature.

It is a still more specific object to feed absorption solution to the evaporator during start-up by providing a conduit connection between the evaporator and the main conduit which returns concentrated solution to the absorber, the conduit connection being constructed and arranged to permit concentrated solution to surge automatically into the evaporator upon start-up and to cease flowing shortly thereafter when the flow of solution in the main conduit drops back to normal.

The invention will be further understood from the following detailed description taken with the single figure which is a diagrammatic view of an absorption refrigeration unit embodying the principles of the invention.

Referring now to the drawing, an illustrative embodiment of the invention is shown as being applied to an absorption refrigeration system of the general type disclosed in the Thomas et al. patent, referred to above. Accordingly, the disclosure of that patent is incorporated herein by reference, insofar as it contributes to the description and understanding of the type of system to which the present invention is particularly applicable, as previously indicated.

The refrigeration system has been shown schematically purely for illustrative purposes, it being understood that the various structures shown in that figure and not a part of the invention may be altered, as desired. It comprises a generator 20, a condenser 22, an absorber-evaporator unit 26, and a heat exchanger 28 interconnected to provide paths of flow for the circulation of refrigerant and absorption solution through the system, as will be understood. These various parts may be of any conventional construction, sealed from the surrounding atmosphere to maintain the subatmospheric pressure conditions therein. As shown, the absorber-evaporator unit 26 includes an absorber 26a and an evaporator 26b disposed adjacent each other within a single casing 27, but it will be appreciated that the absorber and evaporator may be separated from each other and interconnected by a refrigerant carrying conduit as in the Anderson patent.

The generator 20 is shown, for illustrative purposes, as including a plurality of tubular members 30 suitably interconnected as indicated for the flow therethrough of the mixture of refrigerant and absorbent, that is, the dilute absorption solution. These tubular members 30 are heated by any appropriate structure. As shown, they are arranged within a heating chamber 32, with a conventional gas burner 34 arranged underneath the members 30, and with a suitable flue 36 being provided at the upper end of the heating chamber.

A vapor lift tube 38 leads from the outlet 40 of the tubular members 30 to a separating chamber or separator head 42. As is understood, water vapor boiled off in the members 30 will flow up the tube 38, and carry droplets of liquid absorption solution to the separator head 42.

A conduit 44 is shown as connecting the separator head 42 to the condenser 22, and suitable baffling 46 may be provided in the separator to assure that only refrigerant vapor will flow in the conduit 44 to the condenser.

An absorption solution conduit 48 is shown as leading from the separator head 42 to an inner vessel 50 within the heat exchanger 28, and a conduit 52 is shown as connecting this vessel 50 to a distributing trough or spray header 54 within the absorber-evaporator unit 26. As indicated, the absorber 26a may be of any suitable construction, and cooling coils 56 are shown therein communicating with an inlet 58 connected to some appropriate source of cooling medium, for example, water. A conduit 60 connects these cooling coils 56 to the condenser 22, for the flow of the same cooling medium through the condenser 22 and then through an outlet 62, as is understood. The flow of cooling medium will be physically isolated from the flow of the refrigerant and absorbent in the condenser 22 and absorber.

The refrigerant vapor entering the condenser 22 will be condensed therein by reason of the flow of cooling medium therethrough, and liquid refrigerant will leave the condenser through outlet 63 and discharge into conduit 64 for flow to the evaporator 26b through a conduit 66. Suitable means will be provided for maintaining the pressure difference between the condenser and evaporator. As shown, this means comprises an orifice 68 arranged at the inlet to conduit 66 whereby the liquid refrigerant entering the conduit 66 will undergo a pressure drop before reaching the evaporator, as discussed, for example, in the United States patent to Berry, No. 2,563,575.

The evaporator 26b of the absorber-evaporator unit 26 is shown as including a distributor trough 70 connected with the conduit 66 for distributing liquid refrigerant over a coil 71. The coil 71 is filled with water which is chilled by evaporation of the refrigerant on the outside of the coil. The chilled water is pumped through a pipe 72 to an air handling unit (not shown) at the place of use for air cooling, and is then returned to the coil 71 through a pipe 73. The refrigerant which is vaporized by the coil 71 is absorbed by the absorption solution in the absorber-evaporator unit 26. The distributor or spray header 54 in the absorber preferably is designed to effect a desired distribution of the absorption solution over the cooling coils 56 to facilitate the absorption of refrigerant vapor.

The absorption solution diluted in the absorber will then flow through a conduit 74 to the outer chamber 76 of the heat exchanger, and through a conduit 78 into the inlet for the tubular members 30 in the generator 20. It will be understood that the flow of dilute absorption solution through the outer chamber 76 of the heat exchanger 28 will be isolated from the flow of concentrated absorption solution through the inner vessel 50.

The heat exchanger 28 is shown for illustrative purposes as being of the type disclosed in the patent to Simpson, No. 2,685,781, and a vent line 77 is shown connecting the top of the heat exchanger 28 to the separator 42 whereby the heat exchanger will be in communication with the vapor space in the high pressure side of the system. Vent line 77 could connect either into the pipe 44 or the pipe 79, rather than separator 42 for the same purpose, as will be evident.

The illustrated system also includes a concentration control arrangement for withdrawing some liquid refrigerant from the active part of the system during an operating cycle, and for retaining it out of the active circuit during shutdown. This arrangement includes a storage chamber 81 located under the condenser 22 and connected to receive liquid refrigerant from the condenser 22. A conduit 83 is shown as connecting the bottom of the storage chamber 81 to an extension of the conduit 64 leading from the condenser 22, while the conduit 79 is shown as establishing open pressure communication between the storage chamber 81 and the separator head 42. During operation of the unit, condensed liquid refrigerant will be delivered into the storage chamber 81 through conduits 64 and 83, to be stored therein out of the active circuit. The amount of refrigerant stored in the chamber 81 will be governed by the pressure drop from the separator head 42 to the discharge end 63 of the condenser 22. This pressure difference, indicated by the dimension $h$ in the drawing, will vary inversely with the condenser temperature, and is applied through the line 83 to cause the quantity of liquid refrigerant stored in the chamber 81 to vary with the condenser temperature. Thus, as the temperature of the cooling medium flowing through the condenser 22 increases, the pressure at the discharge end of the condenser 22 will increase and become closer to the pressure existing in the separator head 42 whereby the pressure differential indicated by the dimension $h$ will decrease, and more liquid refrigerant will be stored in the chamber 81. Conversely, as the temperature of the cooling medium flowing through the condenser 22 decreases, the pressure at the discharge end 63 of the condenser 22 also decreases whereby the pressure difference $h$ will increase and less liquid refrigerant will be stored in the storage chamber 81.

It will be seen that the refrigeration system thus far described operates in the same general manner as that disclosed in the Anderson patent except that in the present construction the absorber 26a and evaporator 26b are combined in a single unit 26 rather than maintained as separate elements. As previously indicated, the orifice 68 maintains the pressure difference between the condenser 22 and evaporator 26b; and liquid columns formed in the conduits 48, 52, 74 will maintain the pressure difference between the generator 20 and separator 42 on the one hand, and the absorber 26 on the other, as suggested in the Thomas et al. patent. Exemplary levels of the top of the liquid columns in conduits 48 and 74 are indicated by the letters X and Y, respectively, and Z indicates an exemplary liquid level in the outer chamber 76 of the heat exchanger.

As will be apparent from the foregoing, during operation the refrigerant evaporated in the generator 20 will operate to pump the liquid absorbent to the separator head 42 through vapor lift tube 38. In the separator head, the water vapor will be separated from the liquid absorbent, the former passing through the conduit 44 to the condenser 22, and the absorption solution weak in refrigerant passing to the absorber portion of the absorber-evaporator unit 26 through the conduit 48, heat exchanger 28, and conduit 52. The condensed liquid refrigerant leaving the condenser 22 will enter the evaporator portion of the unit 26 through the conduit 66 where it will be at a lower pressure and evaporated by absorbing heat from the water in the coil 71 to effect the desired cooling. The refrigerant vapor is then absorbed by the absorption solution in the unit 26. The resulting dilute absorption solution then passes back to the generator 20 through the conduit 74 and heat exchanger 28. Thus, it will be seen that there are two active and partially overlapping circuits in the system, one for the absorption solution and one for the refrigerant.

The present system is also provided with a low temperature cut-out device which shuts down the system in response to the occurrence of a predetermined low temperature in the evaporator portion of the absorber-evaporator 26. As shown, the cut-out device includes a temperature sensor 80 in thermal contact with the lower end portion of the conduit 66 and a temperature responsive control arrangement 82, 84 for operating a valve 86 in the gas line of the burner 34. In this arrangement, the lower end of the conduit 66 functions as a flash chamber through which liquid refrigerant is introduced into the evaporator 26b. The sensor 80 may conveniently be located in a well 85 in the casing 27 of the absorber-evaporator unit 26. The control arrangement is adjusted to maintain the valve 86 open during normal operation of the system and to close the valve 86 when the temperature in the evaporator portion of the unit 26 drops to the predetermined level. Obviously, other types of temperature-responsive cut-out arrangements may be employed if desired. As discussed above, the function of the cut-out arrangement, during operation of the system, is to shut down the system if the evaporator temperature drops to a level a which the refrigerant might freeze.

During start-up of the system, the low temperature cut-out arrangement 80, 82, 84, and 86 may produce an undesirable situation known as short-cycling during which the system is stopped and started at frequent intervals. This situation results from an abnormally low, although transient, evaporator temperature which activates the control 82 to close the valve 86. The evaporator temperature rises soon after the shut down of the system, thereby causing the valve 86 to open. The closing and opening sequence may be repeated a large number of times under some situations, and when this short cycling occurs, the system cannot operate satisfactorily. The undesirably low evaporator temperature at start-up results from a drop in the pressure in the unit 26 which causes the boiling point of the refrigerant to drop. The pressure drop originates in the unit 26 as a result of the entrance into the unit 26 of cool concentrated solution at a time when only a relatively small amount of refrigerant is present in the conduit 66 and the unit 26.

According to the principles of the present invention, short cycling due to a transient low evaporator temperature during start-up is avoided by temporarily changing the composition of the refrigerant material being evaporated. Normally, of course, this material is only water, and a drop in pressure at the location where evaporation occurs can lower the boiling temperature of the water to a level at which the low temperature cut-off will be activated. According to the present invention, salt solution is withdrawn from part of the system during start-up and is introduced into the refrigerant liquid being evaporated. Thus, a solution rather than pure water is evaporated initially. Since the boiling point of the solution is appreciably higher than that of water, the transient low evaporator pressure does not result in a temperature low enough to active the cut-off.

Referring more specifically to the addition of salt solution to the refrigerant, it has been observed that, in this type of system, there is a temporary surge of cool salt solution in the outlet conduit of the heat exchanger 28 at start-up. In he preferred arrangement this temporary surge is employed to conduct salt solution automatically to the evaporator portion of the absorber-evaporator unit 26. As shown in the drawing there is provided a connection between the upper end of the conduit 52 and refrigerant distributing trough 70 in the form of an inverted U-shaped pipe 88. At start-up the increased volume and higher kinetic energy of the surge of absorbent in the conduit 52 will cause absorbent to splash through the pipe 88 into the trough 70 from which is flows in admixture with refrigerant downwardly over the coil 71. After the initial surge, the solution flow rate in the conduit 52 drops back to normal and solution no longer flows through the pipe 88. By the time refrigerant from the condensor 22 flushes the solution from the conduit 66 and from the outside of the coil 71, the pressure in the absorber-evaporator unit 26 has risen to normal due to increased temperature of the solution in the conduit 52 and the increased refrigerant flow and higher loading in the conduit 66.

It will be appreciated that while automatic transfer of absorber solution to the evaporator 26b is readily and economically effected in the preferred embodiment by the provision of the spill-over pipe 88 spanning the absorber 26a and the evaporator 26b, the invention is not limited to this particular arrangement. For example, when the absorber 26a and the evaporator 26b are separate, spaced apart units as in the Anderson patent, a somewhat more complicated absorber transfer means will be required. Further, in some arrangements it may be desirable to transfer absorber solution from a part of the system other than the conduit connecting the heat exchanger with the absorber.

Therefore, it will be realized that various changes and substitutions may be made to the specific embodiment disclosed herein without departing from the principles of the invention. Accordingly, the disclosed details are not intended to be limiting except as they appear in the appended claims.

What is claimed is:

1. In an absorption refrigeration apparatus including a generator, a condenser, an evaporator, and an absorber interconnected to form a system for circulation of a refrigerant through said parts including a circuit for absorption liquid between said generator and absorber, the improvement which comprises means connected to said apparatus for preventing a rapid drop in the temperature in said evaporator during start-up of said apparatus, said means including conduit means for delivery of absorption liquid from said absorption liquid circuit to said evaporator for a short period of time after start-up whereby the higher boiling point of the absorbent liquid in said evaporator prevents a rapid drop in the evaporator temperature upon start-up.

2. Apparatus as in claim 1 wherein said circuit includes absorption liquid conduit means connecting said generator with said absorber and wherein said conduit means for withdrawing absorption liquid extends between said absorption liquid conduit means and said evaporator.

3. Apparatus as in claim 2 wherein said conduit means for withdrawing absorption liquid is a spill-over pipe which receives and transfers absorption liquid only upon a start-up surge of absorption liquid in said absorption liquid conduit means, said spill-over pipe extending upwardly from said absorption liquid conduit means and then downwardly to said evaporator.

4. In an absorption refrigeration apparatus of the two-pressure type having a plurality of parts including a generator and separating means for forming refrigerant vapor and absorber solution, condenser means receiving refrigerant vapor from said generator and separating means, evaporator means receiving refrigerant liquid from said condenser means, said evaporator means defining separate flow paths for the refrigerant and a fluid medium to be cooled; absorber means for receiving refrigerant vapor from said evaporator means and for absorbing the vapor in liquid absorbent solution, conduit means for conducting liquid absorbent solution to said absorber means from said generator and separating means, and low temperature shut-off means responsive to a predetermined low temperature in the refrigerant flow path of said evaporator means for stopping operation of said apparatus, the improvement which comprises means for temporarily transferring absorbent solution from said conduit means to the refrigerant flow path in said evaporator means under the influence of a temporary surge of absorbent solution in said conduit means occurring at start-up of said apparatus, said transfer means including a pipe communicating at one end with said conduit means and at its other end with said refrigerant flow path whereby upon start-up of said apparatus the material being evaporated in said evaporator means will contain absorbent and will therefore have a higher boiling point than pure refrigerant vapor, the result being that the temperature in said refrigerant flow path remains above the predetermined low temperature at which said shut-off means operates even when a temporary drop in pressure in said refrigerant flow path occurs during start-up.

References Cited by the Examiner

UNITED STATES PATENTS

| | | | |
|---|---|---|---|
| 2,282,503 | 5/1942 | Thomas et al. | 62—487 |
| 2,750,763 | 6/1956 | Kogel | 62—108 |
| 2,855,765 | 10/1958 | Smith et al. | 62—494 X |
| 2,983,110 | 5/1961 | Leonard, Jr. | 62—494 X |
| 3,177,681 | 4/1965 | Phillips et al. | 62—483 |
| 3,177,930 | 4/1965 | Anderson Jr. | 165—62 |

LLOYD L. KING, *Primary Examiner.*